(No Model.)
H. H. PERKINS.
HUSKING PIN OR PEG.
No. 436,378. Patented Sept. 16, 1890.
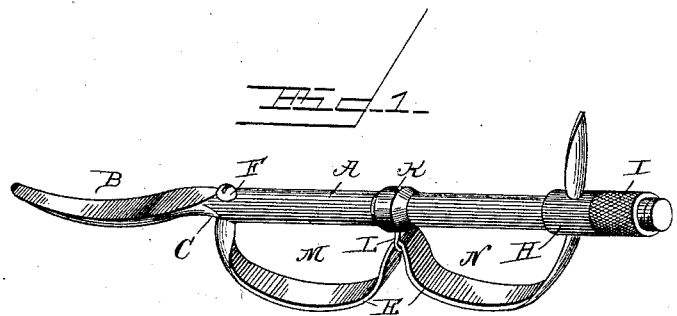
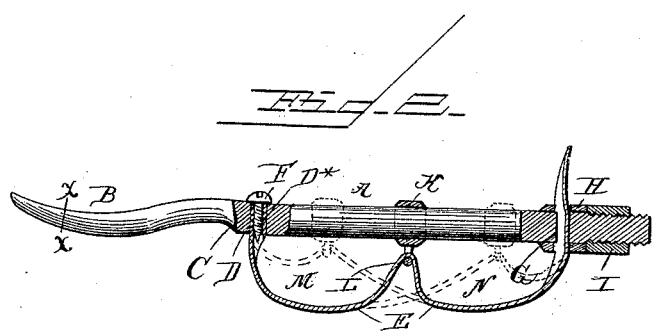
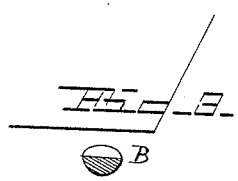
Witnesses
Henry G. Dieterich
C. E. Doyle
Inventor
Hazen H. Perkins.
By his Attorneys

UNITED STATES PATENT OFFICE.

HAZEN H. PERKINS, OF KEWANEE, ILLINOIS.

HUSKING PIN OR PEG.

SPECIFICATION forming part of Letters Patent No. 436,378, dated September 16, 1890.

Application filed April 3, 1888. Serial No. 269,419. (No model.)

*To all whom it may concern:*

Be it known that I, HAZEN H. PERKINS, a citizen of the United States, residing at Kewanee, in the county of Henry and State of Illinois, have invented a new and useful Improvement in Husking Pins or Pegs, of which the following is a specification.

My invention relates to improvements in husking pins or pegs, and it has for its object to provide an improved point therefor which will enable the shuck to be more easily penetrated, and, furthermore, to provide improved means for securing the finger-strap to the pin or peg, whereby the sizes of the loops in the said strap may be varied at will.

With these objects in view the invention consists in a certain novel construction and arrangement of devices, fully set forth and hereinafter claimed.

In the accompanying drawings, Figure 1 is a perspective view of the improved pin or peg. Fig. 2 is a side view of the same, partly in section, to show the manner of connecting the strap to the pin, and indicating in dotted lines various adjustments of the sliding sleeve. Fig. 3 is a cross-section on the line $x\ x$, Fig. 2.

Referring to the drawings, A designates the body of the pin or peg, having the curved half-round point B on its front end, which point is flat on its upper side and is provided in its under side near the butt-end with a rounded notch C, which is adapted to receive the forefinger of the hand which grasps the pin or peg. A smooth aperture D is formed in the body close to the butt-end of the point, and E represents the finger-strap, which is inserted at its front end in the said aperture. A screw F is engaged in the aperture D after the strap is inserted therein, and the latter is thus held securely in the aperture. An aperture G is formed near the rear end of the body, and H is a sliding thimble mounted on the body and having apertures in its opposite sides to align with the aperture G. The rear end of the strap E is inserted in these aligned apertures, and the thumb-nut I is screwed on the end of the body until it bears against the rear end of the thimble and forces the apertures therein slightly out of alignment with the aperture G. It will be seen that the effect of this will be to clamp the end of the strap firmly in the aperture G, and the length of the strap may be altered at will, to suit the size of the hand, by passing more or less of it through the aperture.

I am aware that it is not new to provide a sliding thimble and a nut to bind the same on the end of the body, but the nuts are liable to jar off in use, and it is to obviate this inconvenience that I provide the thimble and nut herein shown. It will be seen that the thimble is of even thickness and size throughout its length, thereby enabling it to be moved freely on the body of the pin without limit, and the threaded portion of the pin or peg is of the same size as the pin or peg—that is, the threads are cut on the full thickness of the same. Therefore the nut I is the same size of the thimble, and it consists of merely a shell, which I find in practice will not jar off in use. A sliding sleeve K is mounted loosely on the body of the pin or peg, and it is provided with a rigid eye L, through which passes an intermediate portion of the strap E. The strap is thus divided into front and rear loops M and N, the respective sizes of which may be altered at will by drawing the strap through the eye and sliding the sleeve on the pin or peg. Thus the finger-strap may be adjusted to fit any hand and any position of the hand, and all slack in the strap may be taken up by passing it through the aperture G, above described.

Having thus described my invention, what I claim, and desire to secure by Letters Patent of the United States, is—

1. A husking-pin provided along its under side with a single continuous strap for confining the fingers, a screw for rigidly securing one end of the strap near the front end of the pin, an adjustable sleeve for adjustably securing the other end of the strap to the rear end of the pin, and an automatically-sliding loop arranged on the pin and having the intermediate portion of the strap passing loosely therethrough, as and for the purpose set forth.

2. A husking-pin having a round straight body and provided with a spoon-shaped point which is flat on its upper side and rounded on its lower side, and provided with a recess or depression at the junction of the point with the body, which recess or depression receives the forefinger when in use, as set forth.

In testimony that I claim the foregoing as my own I have hereto affixed my signature in presence of two witnesses.

HAZEN H. PERKINS.

Witnesses:
WM. GRICE,
F. W. WOLF.